United States Patent [19]

Davidson

[11] Patent Number: 4,586,049

[45] Date of Patent: Apr. 29, 1986

[54] APPARATUS AND METHOD FOR USE IN INSTRUMENT LANDING SYSTEM LOCALIZER AND GLIDE-SLOPE RECEIVERS FOR DERIVING COURSE DEVIATION INFORMATION

[76] Inventor: Eldon F. Davidson, 240 Flower Dr., Folsom, Calif. 95630

[21] Appl. No.: 623,921

[22] Filed: Jun. 25, 1984

[51] Int. Cl.[4] ............ G01S 1/14; G01S 1/16; G01S 1/18

[52] U.S. Cl. .................. 343/414; 343/411; 343/413

[58] Field of Search ........... 343/410, 411, 413, 414, 343/5 LS; 340/951

[56] References Cited

U.S. PATENT DOCUMENTS

| | | | |
|---|---|---|---|
| 3,323,125 | 5/1967 | Lunn et al. | 343/413 |
| 3,413,638 | 11/1968 | Trim | 343/413 |
| 3,934,250 | 1/1976 | Martin, Jr. | 343/6 TV |
| 3,946,387 | 3/1976 | Drucker | 343/413 |
| 4,520,361 | 5/1985 | Frazita | 343/372 |

Primary Examiner—Theodore M. Blum

Assistant Examiner—David Cain

Attorney, Agent, or Firm—R. Gale Rhodes, Jr.

[57] ABSTRACT

Apparatus and method for use in instrument landing system (ILS) localizer and/or glide-slope receivers for deriving course deviation information are described. Specifically, a detected incoming ILS (localizer or glide-slope) signal is first filtered in order to extract appropriate 90 and 150 Hz navigation tones therefrom. Thereafter, two streams of timing pulses are generated; the first stream is phase-locked to the 90 Hz navigation tone and the second stream is phase-locked to the 150 Hz navigation tone. The peak amplitude of the 90 Hz navigation tone is sampled in response to the occurrence of a particular timing pulse occurring in the first pulse stream and the peak amplitude of the 150 Hz navigation tone is sampled in response to the occurrence of a particular timing pulse occurring in the second pulse stream. The sampled values of both navigation tones are then combined to obtain the difference therebetween which, in turn, is used to produce a signal which represents the actual localizer or glide-slope course deviation.

23 Claims, 1 Drawing Figure

APPARATUS AND METHOD FOR USE IN INSTRUMENT LANDING SYSTEM LOCALIZER AND GLIDE-SLOPE RECEIVERS FOR DERIVING COURSE DEVIATION INFORMATION

BACKGROUND OF THE INVENTION

1. Field of the Invention

The invention relates to an apparatus and a method for use in instrument landing system (ILS) localizer and/or glide-slope receivers for deriving course deviation information.

2. Description of the Prior Art

Pilots often fly aircraft under conditions, such as adverse weather, which necessitate flying under instrument flight rules (so-called IFR conditions). An essential component of such flight is reliance on an instrument landing system (ILS). This system, which includes a number of ground-based transmitters and various ILS receivers installed in the aircraft, provides the pilot with appropriate navigation information to enable the pilot to place his aircraft on a proper inbound (or in certain instances outbound) course to (or from) a runway. In particular, an ILS system typically provides the pilot with information which indicates the aircraft's vertical and horizontal deviation from one or more pre-selected approach paths to (or from) a particular runway at a desired airport. The "glide-slope" ILS receiver derives the vertical deviation information; while the "localizer" ILS receiver derives the horizontal deviation information. These deviations are, in turn, displayed on appropriate indicators, usually meters or the like, and may also be fed to appropriate on-board auto-pilot systems.

An Instrument Landing System typically consists of three ground-based (localizer, glide-slope and marker beacon) transmitters and suitable ILS receivers mounted in the aircraft. The ground-based localizer transmitter located at a far end of a runway radiates, on a selected one of 40 channels spaced 50 kHz apart between 108–112 mHz, two antenna patterns which together provide an equisignal course along and extending out beyond the centerline of the runway. In particular, the left-hand pattern is amplitude modulated, typically by 20%, by a 90 Hz tone (or signal); while the right-hand pattern is amplitude modulated, also at approximately 20%, by a 150 Hz tone (or signal). The airborne ILS localizer receiver detects both of these tones (hereinafter referred to as the localizer pair), rectifies the results and presents a left/right deviation display on a zero-center DC meter situated in the cockpit of the aircraft. The ground-based glide-slope transmitter located at an approach end of a runway radiates, on a pre-determined channel (paired with the localizer channel) in the 330–335 mHz band, two antenna patterns which provide an equisignal course oriented along an approximate 3 degree incline emanating from the approach end of the runway. The lower pattern is amplitude modulated, typically also by 20%, by a 150 Hz tone; while the upper pattern is amplitude modulated, also at approximately 20%, by a 90 Hz tone. The airborne ILS glide-slope receiver, in much the same manner as the ILS localizer receiver, detects both of these tones (hereinafter referred to as the glide-slope pair), rectifies the results and presents an above/below deviation display typically on another zero-center DC meter. Both the localizer and glide-slope meter needles are visably mounted within the same housing and are perpendicuarly oriented with respect to each other. Such a combined meter is commonly referred to as a "cross-pointer" display.

Whenever an aircraft is "on course" (both horizontally and vertically), i.e. following an appropriate ILS approach, to an ILS equipped runway, both the ILS localizer and glide-slope receivers will detect equal levels of the 90 and 150 Hz modulating tones. Hence, for this instance, no deviation exists and none will be displayed. However, if the aircraft is situated on an inbound course which deviates to the right of the localizer course (runway centerline), the amplitude of the 150 Hz tone in the localizer pair will be greater than that of the 90 Hz tone in that pair. Alternatively, should the aircraft be situated on an inbound course which deviates to the left of the localizer course, then the amplitude of the 90 Hz tone in the localizer pair will predominate over that of the 150 Hz tone in that pair. Furthermore, if the aircraft is situated above a selected glide-path, then the 90 Hz modulating tone in the glide-slope pair will possess a greater amplitude than the 150 Hz modulating tone in that pair. Likewise, if the aircraft is below the glide-path, then the amplitude of the 150 Hz tone in the glide-slope pair will predominate instead. In each instance, appropriate visual indications of any actual vertical and horizontal deviations, from the selected ILS approach, will be derived by the appropriate ILS receiver and displayed on the cross-pointer display.

Generally, the signal analyzing circuitry of both the ILS localizer and glide-slope receivers known to the art is rather simple and is the same for both receivers. This circuitry typically comprises a suitable rf (radio frequency) front end, an AM (amplitude modulated) detector, 90 and 150 Hz band-pass filters, rectifiers, a DC (direct current) comparator and one of the indicators of a cross-pointer display. In particular, for either receiver, the appropriate incoming ILS modulated carrier signal is first amplified, de-modulated and then filtered to yield the 90 and 150 Hz navigation tones. Each resulting navigation tone is then rectified to produce a DC voltage proportional to the peak amplitude of the tone. Thereafter, the comparator determines the difference between the amplitudes of the two DC voltages associated with both navigation tones and, in turn, applies a voltage indicative of course deviation to the appropriate indicator in the cross-pointer display.

Although these analyzing circuits are quite simple, they only provide accurate results in the absence of interfering signals. Unfortunately, interference can not be avoided. In fact, the performance of existing ILS glide-slope and localizer receivers, typified by that described above, continually degrades in the presence of increasing interference and is thus often only marginal at best. In particular, whenever an interfering signal is present along with the navigation tones in either of these ILS receivers, this interfering signal is attenuated somewhat by both the 90 and 150 Hz band-pass filters. The remaining portion of the interfering signal present at the output of these filters adds to the amplitude of the 90 and 150 Hz navigation tones. In the remote event that this portion presents the same amplitude at the output of both the 90 and 150 Hz filters, then this interference would not adversely affect the course deviation information. However, most interfering signals will be unequally attenuated by these filters and will thus affect the amplitude of one of the navigation tones, i.e. either the 90 or the 150 Hz tone, to a greater degree than the other. For example, an interfering signal might contain a 210 Hz audio component. In this case, the 150 Hz band-pass filter might attenuate this 210 Hz signal to a level of approximately 125 mV (millivolts); while the 90 Hz band-pass filter would generally attenuate this audio signal to a lower level, such as 40 mV. As a result, an 80 mV imbalance would exist. Since, most course deviation meters only require 150 mV for full scale deflection, this imbalance would drive the meter to an erroneous half scale deflection. As the frequency of the interfering signal approaches 150 Hz, the imbalance becomes greater. Likewise, similar interference and erroneous deviation indications would be produced from interfering signals that contain audio components below 90 Hz and even between 90 and 150 Hz.

Unfortunately, presently available ILS receivers, particularly the localizer receiver, are particularly susceptible to interference from multiple signals, such as those generated from commercial FM broadcast stations. This interference can result from spurious signals generated from either a commercial FM broadcast station itself or intermodulation frequencies generated by the interaction of multiple broadcast frequencies transmitted from a common antenna, or even from the interaction of the transmissions from two or more separate FM broadcast signals that are both situated close to the 108–112 mHz band used for localizer transmissions wherein at least one of the FM stations is sufficiently powerful to overload the ILS localizer receiver and drive it into non-linear operation. Fortunately, as the result of the efforts of the Federal Communications Commission in not authorizing operation of a powerful FM station on a frequency in close proximity to that of an existant ILS localizer transmitter, no serious FM interference exists in ILS systems operating in the United States. However, as the result of a worldwide re-allocation of radio spectrum which occurred in 1979 and which extended the upper end of the world-wide FM broadcast band from 100 mHz to 108 mHz, powerful new FM broadcast stations which will operate on frequencies close to 108 mHz are expected to be built in Europe, Africa, and parts of the Middle East. Hence, these new stations are expected to impose serious FM interference to the ILS systems operating in these areas and thus jeopardize the safety of aircraft operating there. See, e.g., Klass, "New Stations May Disrupt Air Navigation", *Aviation Week and Space Technology*, Sept. 5, 1983; pages 33–34.

SUMMARY OF THE INVENTION

Accordingly, an object of the present invention is to provide apparatus for use in an ILS receiver which generates extremely accurate glide-slope and localizer course deviation information.

Another object is to provide such apparatus which generates course deviation information that is substantially unaffected by all factors other than actual glide-slope and localizer course deviations.

A particular object is to provide such apparatus, for use in ILS glide-slope and localizer receivers, which is essentially immune to any interfering signals.

A more particular object is to provide such apparatus which generates extremely accurate localizer and glide-slope course deviation information even in the presence of significant interference produced by powerful FM broadcast stations.

Another object is to provide such apparatus which is simple, very inexpensive to manufacture and can be readily added to existing ILS localizer and glide-slope receivers.

These and other objects are accomplished in accordance with the invention by apparatus which comprises: means for filtering a detected incoming ILS signal to extract first and second navigation signals therefrom, means for generating a first stream of timing pulses phase-locked to the first navigation signal and a second stream of timing pulses phase-locked to the second navigation signal, means for sampling the amplitude of the first navigation signal in response to the occurrence of a selected pulse in the first stream of timing pulses in order to obtain a sampled value substantially equivalent to the peak amplitude of the first navigation signal, means for sampling the amplitude of the second navigation signal in response to the occurrence of a selected pulse in the second stream of timing pulses in order to obtain a sampled value substantially equivalent to the peak amplitude of the second navigation signal, and means for combining the sampled values of the first and second navigation signals in order to obtain the difference therebetween and, in response to this difference, producing a signal representing actual course deviation.

In accordance with a preferred embodiment described herein, a pair of 90 and 150 Hz navigation signals (or tones) are first extracted, through appropriate filtering, from a detected incoming ILS localizer signal. Thereafter, a stream of 9 kHz timing pulses phase-locked to the 90 Hz localizer tone is generated, and a separate stream of 15 kHz timing pulses phase-locked to the 150 Hz localizer tone is also generated. The phase-locked 9 kHz timing pulses are appropriately gated to produce a narrow sampling pulse (hereinafter referred to as the 9 kHz sampling pulse) which occurs at the 270 degree point on each sinewave comprising the 90 Hz localizer tone. In a similar fashion, the phase-locked 15 kHz timing pulses are appropriately gated to produce a narrow sampling pulse (hereinafter referred to as the 15 kHz sampling pulse) which occurs at the 90 degree point on each sinewave of the 150 Hz localizer tone. In response to the 9 kHz sampling pulses, a sample and hold circuit successively samples the 90 Hz sinusoidal localizer tone and produces a DC voltage which tracks the negative peak values of this tone. Similarly, the 15 kHz sampling pulses cause a second sample and hold circuit to successively sample the 150 Hz sinusoidal localizer tone and, in turn, produce a DC voltage which tracks the positive peak values of this tone. Both DC voltages are then algebraically added. The resulting sum is applied to the localizer indicator on a cross-pointer display to indicate localizer course deviation information.

Since glide-slope deviation is determined from a pair of 90 and 150 Hz navigation tones in the same manner as localizer deviation, apparatus substantially identical to that described above can be used in the ILS glide-slope receiver to analyze this pair of tones and display the appropriate glide-slope deviation information.

BRIEF DESCRIPTION OF THE DRAWING

The invention may be clearly understood from a consideration of the detailed description taken in conjunction with the accompanying drawing, in which.

DETAILED DESCRIPTION

Figure 1:
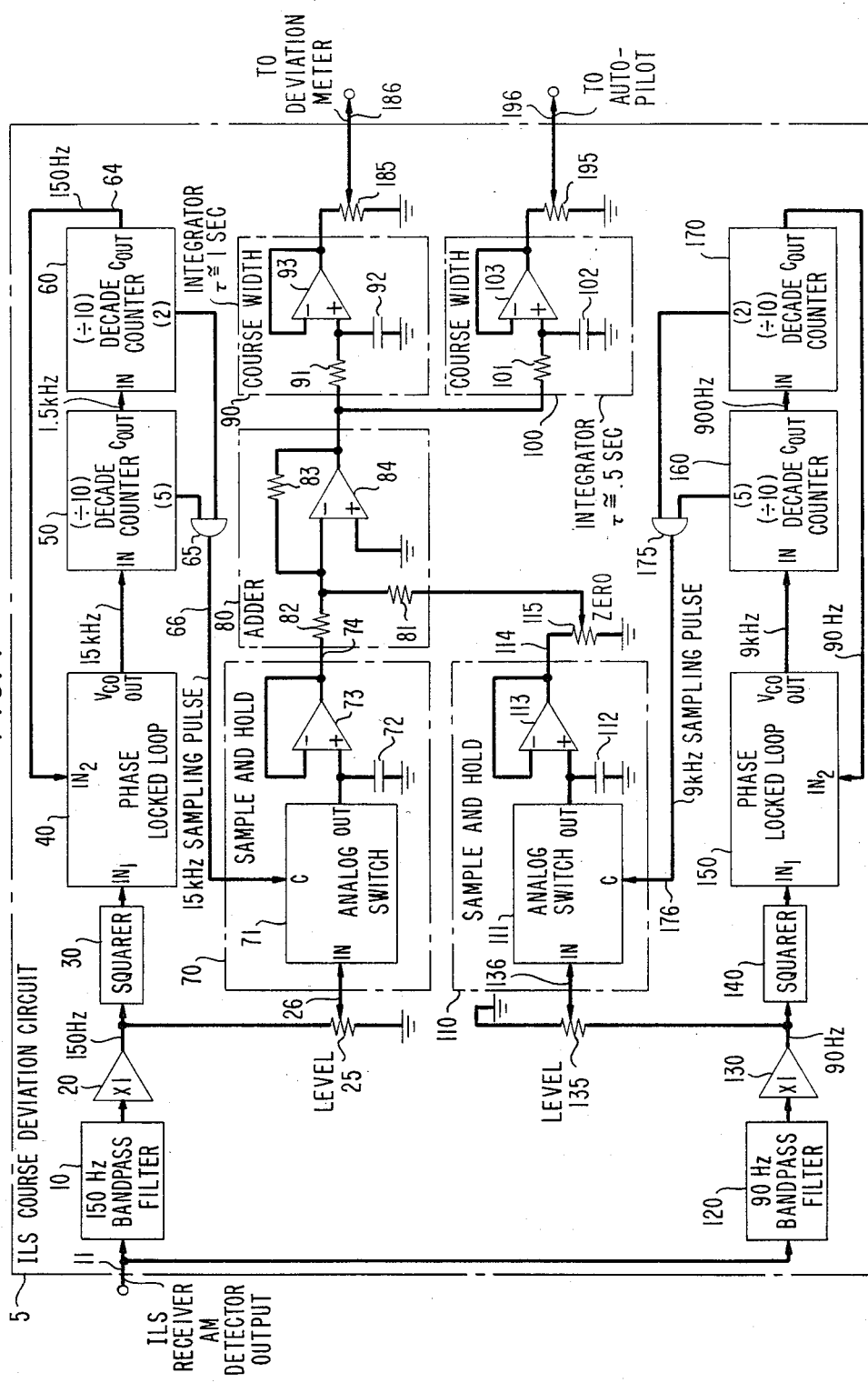
FIG. 1 is a block diagram of a circuit, embodying the principles of applicant's invention, for inclusion in an ILS localizer or glide-slope receiver for deriving ILS localizer or glide-slope deviation information, respectively.

FIG. 1 shows applicant's inventive circuit for deriving either ILS localizer or glide-slope deviation information from a suitably detected incoming ILS signal. Inasmuch, as both localizer and glide-slope deviation information are identically based upon amplitude differences of respective 90 and 150 Hz navigation signals (hereinafter referred to as tones), the circuit shown in this FIGURE can advantageously be incorporated in the same fashion, in both the ILS localizer and glide-slope receivers. Although, for the sake of brevity, the following discussion will center on incorporating the circuit into the localizer receiver, it will be readily apparent to anyone skilled in the art as to how the circuit is to be incorporated into the glide-slope receiver.

As shown in the FIGURE, the detected incoming ILS (localizer) signal is applied to the 150 Hz navigation tone processing circuit comprised of: 150 Hz band-pass filter 10; unity gain buffer amplifier 20; squarer 30; phase locked loop 40, decade counters 50 and 60; AND gate 65; and sample and hold circuit 70 itself containing analog switch 71, capacitor 72 and buffer amplifier 73. Specifically, the detected incoming ILS localizer signal is applied, via lead 11, to 150 Hz band-pass filter 10 which extracts the 150 Hz localizer navigation tone from the detected ILS signal. This filter is extremely selective and preferably possesses a bandwidth of only a few hertz. Next, the 150 Hz sinusoidal tone is buffered by unity gain buffer amplifier 20 and then applied to the input of squarer 30. Squarer 30, implemented using a comparator, produces a 150 Hz square-wave signal at its output. This square wave is, in turn, applied as one input to a phase detector contained within phase locked loop 40. The other input to the phase detector, applied via lead 65, is the output of the voltage controlled oscillator (VCO) contained within the phase locked loop but counted down by 100 by decade counters 50 and 60. Within phase locked loop 40—illustratively CMOS type 4046, the output of the phase detector is applied to the control input of the VCO and, in turn, causes the VCO to produce a stream of timing pulses, illustratively square waves, having a frequency of exactly 100 times that of the 150 Hz input square wave, i.e. 15 kHz.

By virtue of the feedback path around the phase locked loop, the 15 kHz timing pulses produced by the VCO are phase-locked, at a zero phase difference, not only to the 150 Hz square wave applied as one input to the phase locked loop but also to the 150 Hz navigation tone. Since, decade counters 50 and 60 together count 100 successive pulses of the 15 kHz timing signal for each of the 150 Hz square waves, the 25th pulse out of each 100 pulses exactly coincides with the 90 degree point on each sinewave comprising the 150 Hz navigation tone, i.e. the point at which the positive peak amplitude of this tone occurs. Both decade counters, illustratively CMOS type 4017, have a separate output for each count stored therein. The fifth count output of decade counter 50 and the second count output of decade counter 60 are both applied to respective inputs of AND gate 65 which, in turn, produces a output pulse, 66.67 usec in width, exactly coincident with the 90 degree point on each sine wave comprising the 150 Hz navigation tone. This narrow output pulse (hereinafter referred to as the 15 kHz sampling pulse), appearing on lead 66, is applied to the control input of sample and hold circuit 70 and, more particularly, to the control input of analog switch 71. Each 15 kHz sampling pulse causes sample and hold circuit 70 to sample the simultaneously occurring positive peak value of the 150 Hz navigation tone. During successive samples, sample and hold circuit 70 maintains ("holds") its output at a constant value equal to that of the most recent sample. As shown, sample and hold circuit 70 is comprised of analog switch 71, capacitor 72 and amplifier 73. Each 15 kHz sampling pulse applied to the control input of analog switch 71 causes the switch to apply the voltage appearing at its input to its output. Consequently, the positive peak value of the 150 Hz tone is applied through the switch to capacitor 72. Since the analog switch has an extremely low "on" resistance, typically in the range of 100 ohms, capacitor 72 quickly charges to the positive peak value on the 150 Hz navigation tone. Capacitor 72 is connected across the input to buffer amplifier 73. Since this amplifier has a very high input resistance, typically in the range of several hundred megaohms, the voltages appearing across capacitor 72 and at the output of amplifier 73 remain constant for a relatively long time—much longer than the interval between successive samples. Since a sample is only taken at successive 90 degree points on the 150 Hz localizer navigation tone, the voltage appearing at the output of buffer amplifier 73, i.e. on output lead 74 of sample and hold circuit 70, accurately and linearly tracks any changes in the peak amplitude of this tone.

As is evident from the FIGURE, the 90 Hz localizer navigation tone is processed in much the same manner as is the 150 Hz localizer navigation tone. The 90 Hz localizer tone processing circuit is comprised of 90 Hz band-pass filter 120; unity gain buffer amplifier 130; squarer 140; phase-locked loop 150; decade counters 160 and 170; AND gate 175; and sample and hold circuit 110 which itself contains analog switch 111, capacitor 112 and buffer amplifier 113. The 90 Hz navigation tone processing circuit operates nearly identically to that of the 150 Hz navigation tone processing circuit, as described in detail above, except that the sampling pulse (hereinafter referred to as the 9 kHz sampling pulse) produced by AND gate 175 occurs coincident with the 270 degree point, rather than the 90 degree point, of each sine wave comprising the 90 Hz localizer navigation tone. In particular, the VCO in phase locked loop 150, like that contained within phase locked loop 40, generates a stream of timing pulses at a frequency that is exactly 100 times that of the incoming navigation tone, i.e. here 90 Hz. The resulting stream of 9 kHz timing pulses produced by this VCO is phase-locked at a zero phase difference to the 90 Hz localizer navigation tone. As a result, the 75th pulse in each sequence of 100 9 kHz pulses produced by the VCO contained within phase locked loop 150 occurs substantially coincident with the 270 degree point, i.e. the negative peak point, of a successive sine wave comprising the 90 Hz localizer navigation tone. AND gate 175 detects the occurerence of this 75th pulse, through gating the 5th output of decade counter 160 and the 7th output of decade counter 170, and applies the resulting 9 kHz sampling pulse, via lead 176, to the control input of sample and hold circuit 110, and specifically to the control input of analog switch 111. Consequently, at the occurrence of each successive 9 kHz sampling pulse, sample and hold circuit 110 samples the negative peak value of a successive sine wave comprising the 90 Hz localizer tone and then changes its output voltage accordingly. As a result, the voltage appearing at the output of sample and hold circuit 110, and particularly on lead 114, accurately and linearly tracks any changes in the negative peak amplitude of the 90 Hz localizer navigation tone.

To determine localizer deviation information, the positive voltage produced by sample and hold circuit 70 is added to the negative voltage produced by sample and hold circuit 110 by adder 80. Since, the amplitudes of both the 90 and 150 Hz localizer navigation tones are equal whenever the aircraft is situated on the ILS localizer course, the positive and negative voltages produced by both sample and hold circuits are also equal and thus combine to produce a zero-valued voltage on output lead 85 of adder 80. Thus, in this instance, the localizer needle of the cross-pointer display remains centered. The values of resistors 81, 82 and 83 are all selected to produce equal values of gain for both inputs to adder 80. Zero adjust potentiometer 114 is appropriately set to a value which compensates for any gain differences remaining between these two inputs. Also, level adjust potentiometers 25 and 135 are both set, during calibration, to appropriate values to ensure that equal levels of signal will be applied to both sample and hold circuits whenever the aircraft is exactly situated on the localizer course.

In the event an aircraft drifts off to the right of the localizer course, then the amplitude of the 150 Hz localizer navigation tone will be greater than that of the 90 Hz localizer navigation tone. Thus, the amplitude of the positive voltage produced by sample and hold circuit 30 increases and the amplitude of the negative voltage produced by sample and hold circuit 110 decreases. The difference between these two voltages is amplified and inverted by adder 80. The resulting negative voltage is then integrated, as discussed below, and then applied to the localizer section of a cross-pointer display such that the localizer deviation needle, swings to the left. This, in turn, permits the pilot to eliminate the localizer course deviation by turning the aircraft to the left in order to "fly into the needle". Clearly, whenever the aircraft drifts off to the left of the localizer course, the opposite condition occurs.

To minimize the effects of any interference on the incoming detected navigation tones as well as eliminate any unwanted sudden deflections in the appropriate cross-pointer display needle, the output voltage produced by adder 80 is applied to integrators 90 and 100, each of which serves to integrate and thus smooth the output voltage. Within integrator 90, the output signal produced by adder 80 is first applied to an RC circuit, comprised of resistor 91 and capacitor 92, which provides an approximate 1 second time constant. This time constant is long enough to ensure smooth movement of the appropriate cross-pointer display needle to actual changes in localizer course deviation and is sufficiently short to minimize any unnecessary time lags which would otherwise cause a pilot to overshoot the localizer course when making an instrument approach. The smoothed output from this RC circuit is applied to non-inverting amplifier 93 which provides a sufficient signal to properly drive the localizer deviation indicator on a cross-pointer display. Integrator 100, through resistor 101 and capacitor 102, smoothes the output signal produced by adder 85 using a time constant of approximately 0.5 seconds to provide an output signal having a response time suitable for interfacing to existing auto-pilot systems. The smoothed output from this RC circuit is applied to non-inverting amplifier 103 which provides a sufficient signal to properly interface to an auto-pilot system. Course-width potentiometers 185 and 195 are suitably adjusted to attenuate the full-scale output signals produced by integrators 90 and 100 to appropriate levels for proper interfacing to the cross-pointer display and auto-pilot system, respectively.

As noted previously, circuitry identical to that described above can be readily incorporated into an ILS glide-slope receiver to provide accurate glide-slope deviation information.

The ability of the phase-locked analyzing circuits to advantageously minimize the effects of any interfering signals, particularly from FM broadcast stations, results from the fact that only the phase-locked 90 and 150 Hz navigation tones are sampled. An interfering signal (such as a detected audio component of an FM signal having a carrier frequency close to that of an ILS localizer transmitter) which has a different frequency that either 90 or 150 Hz will slip phase compared to the navigation tones at a rate which is equal to the frequency difference between the interfering signal and a particular navigation tone. Such an interfering signal will add to and subtract from the peak values of the navigation tones and thus cause respective AC components to be superimposed onto the DC levels produced by the 90 and 150 Hz sample and hold circuits. The RC circuits present in integrators 90 and 100 will effectively filter out these AC components and thereby prevent unwanted interference from corrupting the deviation information produced by the inventive ILS analyzing circuits.

Furthermore, the performance of the inventive ILS localizer and glide-slope analyzing circuits is substantially unaffected by any path length differences between direct and reflected transmitted ILS signals. In particular, a reflected signal possesses a slightly different phase than a direct signal. Also, the frequency of a reflected signal continually varies as an aircraft moves. Any such frequency differences are usually quite small, ranging from a few hundredths of a hertz to perhaps 0.15 Hz. The navigation tones in both the direct and reflected signals combine, through vector addition, at the outut of the AM detector to produce 90 and 150 Hz navigation tones which both possess peak amplitudes and phase differences that vary at the same frequency, typically between 0.01 to 0.15 Hz. Since the phase locked loops in both the localizer and glide-slope analyzing circuits have loop filters which allow the VCOs in these phase locked loops to follow these slow phase changes, the 9 kHz and 15 kHz sampling pulses still occur precisely at the 270 and 90 points on the 90 and 150 Hz navigation tones, respectively. As a result, any change in the output voltages produced by the sample and hold circuits attributable to these slow frequency differences in both the 90 and 150 Hz tones are equal and opposite and thus cancel in adder 80. Hence, the deviation displays are substantially unaffected by any path length differences.

Advantageously, the use of phase-locked timing signals to control the sample and hold circuits also renders the ILS localizer and glide-slope analyzing circuits substantially immune to any similar changes occurring in the frequency of both the 90 and 150 Hz navigation tones. This immunity is particularly important because many old ILS transmitters rely on the 60 Hz power line frequency to generate both the 90 and 150 Hz tones. Unfortunately, the power line frequency often varies somewhat from 60 Hz and even greater variation occurs whenever the ILS transmitters are operating on emergency power, such as that provided by a local generator.

Clearly, it is readily apparent to anyone skilled in the art that many modifications can be made to the inventive ILS analyzing circuit. For example, if the inputs to AND gate 175 were re-configured to pick off the 25th pulse rather than the 75th pulse counted by decade counters 160 and 170, then a subtractor can be substituted for adder 80 to appropriately combine the output voltages produced by both sample and hold circuits. In this case, the output of sample and hold circuit 100 would be applied to the negative input of the subtractor.

Hence, many varied arrangements can be made by those skilled in the art without departing from the spirit and scope of the invention.

I claim:

1. Apparatus for use in an instrument landing system (ILS) localizer or glide-slope receiver for deriving actual course deviation, said apparatus comprising:
   means for filtering a detected incoming ILS signal in order to extract first and second navigation signals therefrom,
   means for synthesizing a first stream of timing pulses phase-locked to said first navigation signal and a second stream of timing pulses phase-locked to said second navigation signal,
   first means for sampling the amplitude of said first navigation signal in response to the occurrence of a first selected pulse in said first stream of timing pulses in order to obtain a sampled value substantially equivalent to the peak amplitude of said first navigation signal,
   second means for sampling the amplitude of said second navigation signal in response to the occurrence of a second selected pulse in said second stream of timing pulses in order to obtain a sampled value substantially equivalent to the peak amplitude of said second navigation signal, and
   means for combining the sampled values of said first and second navigation signals so as to obtain the difference therebetween and, in response to the difference, producing a signal representing actual course deviation.

2. The apparatus of claim 1 further comprised of means for generating said first and second streams of timing pulses at a frequency which is a pre-selected multiple of the frequency of said first and second navigation signals, respectively.

3. The apparatus of claim 2 further comprised of means for selecting first and second pulses occurring in said first and second streams of timing pulses, respectively, wherein said first and second selected pulses occur substantially coincident with the peak amplitudes of said first and second navigation signals, respectively.

4. The apparatus of claim 3 wherein said first sampling means is comprised of:
   means for producing a sample of a substantially simultaneously occurring peak value of said first navigation signal, in response to the first selected pulse,
   means for generating a first output signal having a value substantially equal to the amplitude of the most recently occurring peak value of said first navigation signal, and
   means for maintaining the amplitude of said first output signal substantially constant during an interval of time occurring between successive samples of said first navigation signal.

5. The apparatus of claim 4 wherein said second sampling means is comprised of:
   means for producing a sample of a substantially simultaneously occurring peak value of said second navigation signal, in response to the second selected pulse,
   means for generating a second output signal having a value substantially equal to the amplitude of the most recently occurring peak value of said second navigation signal, and
   means for maintaining the amplitude of said second output signal substantially constant during an interval of time occurring between successive samples of said second navigation signal.

6. The apparatus of claim 5 wherein said selecting means further comprises means for providing said first selected pulse coincident with the occurrence of a positive peak in the amplitude of said first navigation signal and for providing said second selected pulse substantially coincident with a negative peak in the amplitude of said second navigation signal.

7. The apparatus of claim 5 wherein said selecting means further comprises means for providing said first and second selected pulses substantially coincident with the occurrence of respective positive peaks in the amplitudes of said first and second navigation signals, respectively.

8. The apparatus of claim 6 wherein said combining means is further comprised of means for additively combining said first and second output signals in order to produce a resultant signal proportionally related to actual course deviation.

9. The apparatus of claim 8 further comprised of means for integrating said resultant signal in order to produce a smoothed signal representing actual course deviation.

10. The apparatus of claim 7 wherein said combining means further includes means for subtractively combining said first and second output signals in order to produce a resultant signal proportionally related to said actual course deviation.

11. The apparatus of claim 10 further comprised of means for integrating said resultant signal in order to produce a smoothed signal representing said actual course deviation.

12. The apparatus of claim 7 wherein said pre-selected multiple is at least 100, and the selected pulse for either said first or second streams of timing pulses is either the 25th or 75th pulse in each sequence of 100 pulses occurring in each respective stream between successive samples of said first or second navigation signals, respectively.

13. A method for use in an instrument landing system (ILS) localizer or glide-slope receiver for deriving actual course deviation, said method comprising the steps of:
   filtering a detected incoming ILS signal in order to extract first and second navigation signals therefrom,
   synthesizing a first stream of timing pulses phase-locked to said first navigation signal and a second stream of timing pulses phase-locked to said second navigation signal,
   first sampling the amplitude of said first navigation signal in response to the occurrence of a first selected pulse in said first stream of timing pulses in order to obtain a sampled value substantially equivalent to the peak amplitude of said first navigation signal, second sampling the amplitude of said second navigation signal in response to the occurrence of a second selected pulse in said second stream of timing pulses in order to obtain a sampled value substantially equivalent to the peak amplitude of said second navigation signal, and combining the sampled values of said first and second navigation signals so as to obtain the difference therebetween and, in response to the difference, producing a signal representing actual course deviation.

14. The method of claim 13 further comprised of the step of generating said first and second streams of timing pulses at a frequency which is a pre-selected multiple of the frequency of said first and second navigation signals, respectively.

15. The method of claim 14 further comprised of the step of selecting first and second pulses occurring in said first and second streams of timing pulses, respectively, wherein said first and second selected pulses occur substantially coincident with the peak amplitudes of said first and second navigation signals, respectively.

16. The method of claim 15 wherein said first sampling step is comprised of the steps of:

producing a sample of a substantially simultaneously occurring peak value of said first navigation signal, in response to the first selected pulse, generating a first output signal having a value substantially equal to the amplitude of the most recently occurring peak value of said first navigation signal, and maintaining the amplitude of said first output signal substantially constant during an interval of time occurring between successive samples of said first navigation signal.

17. The method of claim 16 wherein said second sampling step is comprised of the steps of:

producing a sample of a substantially simultaneously occurring peak value of said second navigation signal, in response to the second selected pulse, generating a second output signal having a value substantially equal to the amplitude of the most recently occurring peak value of said second navigation signal, and maintaining the amplitude of said second output signal substantially constant during an interval of time occurring between successive samples of said second navigation signal.

18. The method of claim 17 wherein said selecting step further comprises the steps of:

providing said first selected pulse coincident with the occurrence of a positive peak in the amplitude of said first navigation signal, and providing said second selected pulse substantially coincident with a negative peak in the amplitude of said second navigation signal.

19. The method of claim 17 wherein said selecting step further comprises the step of providing said first and second selected pulses substantially coincident with the occurrence of respective positive peaks in the amplitudes of said first and second navigation signals, respectively.

20. The method of claim 18 wherein said combining step is further comprised of the step of additively combining said first and second output signals in order to produce a resultant signal proportionally related to actual course deviation.

21. The method of claim 20 further comprised of the step of integrating said resultant signal in order to produce a smoothed signal representing actual course deviation.

22. The method of claim 19 wherein said combining step further includes the step of subtractively combining said first and second output signals in order to produce a resultant signal proportionally related to said actual course deviation.

23. The method of claim 22 further comprised of the step of integrating said resultant signal in order to produce a smoothed signal representing said actual course deviation.

* * * * *